A. WEINHOLD.
AUTOMATICALLY WORKING POND DRAINER.
APPLICATION FILED DEC. 4, 1916.
1,221,251.
Patented Apr. 3, 1917.
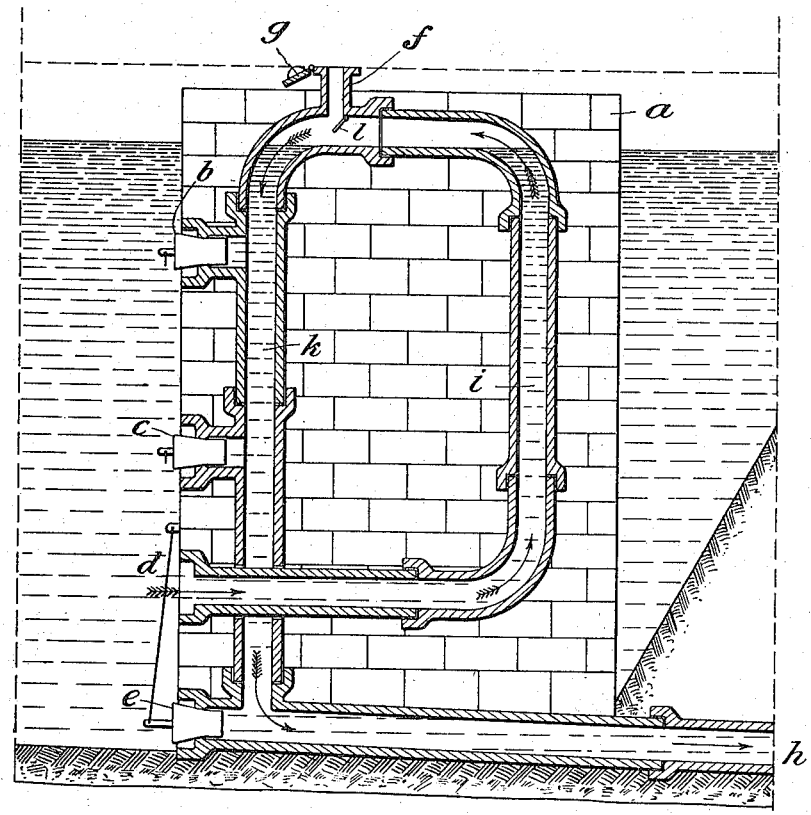

UNITED STATES PATENT OFFICE.

ARTHUR WEINHOLD, OF MACKRANSTÄDT, NEAR LEIPZIG, GERMANY.

AUTOMATICALLY-WORKING POND-DRAINER.

1,221,251.            Specification of Letters Patent.          Patented Apr. 3, 1917.

Application filed December 4, 1916. Serial No. 135,056.

*To all whom it may concern:*

Be it known that I, ARTHUR WEINHOLD, a subject of the German Emperor, and residing at Rittergut Lausen, post Mackranstädt, near Leipzig, Germany, have invented certain new and useful Improvements in Automatically-Working Pond-Drainers, of which the following is a specification.

The subject matter of the present invention is an automatically working solid pond-drainer, leading off the lowest layers of the water first, said pond-drainer being not only adapted to completely drain a pond, but simultaneously avoids automatically overflowing of the pond in events of torrential rain, showers, melting of the snows and the like.

One of the essential advantages of the presently described pond-drainer being, that it does not lead off the warm and well-aired water at the surface of the pond but always the water from the ground, which is poor in nourishments, cold and mostly swampy. This is a great advantage for fish-breeding.

The annexed drawings represent the said pond-drainer in section.

Pipes of fire-brick are built into the masonry $a$ in form of a loop, as may be seen in the drawing.

In order to be able to drain off the water in such a manner that different levels of the water may be attained at will, sockets $b$, $c$ are provided at the vertical part $k$ of the pipe which may be closed by means of suitable wooden plugs. In the same way a socket $e$ is provided, by means of which the tank or pond may be wholly drained off. The socket $f$ provided at the highest point of the pipe is air-tight closed by means of the flap $g$. This latter socket projects from the masonry $a$ and lies above the normal level of the pond.

A flap valve $l$ is provided in the interior of the pipe.

Normally the sockets $b$, $c$, and $e$ of the apparatus are closed whereas the socket $f$ is opened. Now the water enters at $d$ rises in part $i$ of the pipe and flows off through part $k$. The quantity of the water led off, corresponds to the inflow of the pond.

It is evident that in the present arrangement the lower layers of the water will be first led off, whereas the water at the surface of the pond will be the last that is drained off when the whole pond is emptied.

In order to prevent fishes being drawn off with the outflowing water, screens are arranged before the different sockets.

The pond-drainer works as follows:

If the water rises in the pond, the water in pipe $i$ will gradually rise accordingly to the socket $f$ and thereby close the valve $l$.

Hereby the air admission to the pipe is interrupted and the pipe will act as a siphon, whereby the water is sucked off at $d$ with great power. This effect lasts until the water level allows air to pass through $f$, whereby the suction-action is interrupted and the normal level of the pond is attained.

If one desires to completely drain off the pond and therefore the action of the siphon must be reëstablished, the outlet $h$ is to be closed. As soon as this is effected and the outlet is again opened the water is gathered in part $k$ of the pipe, the flap $g$ is closed and the water will be quickly drawn off by the siphon to the socket $d$. Even now the surface water will not be drawn off. If the pond is emptied to the level of socket $d$ water enough will be left in the pond to keep the fishes alive, and the next day the water may be completely drained off in removing the closure member from outlet $e$.

Having thus fully described my invention I claim as new and desire to secure by Letters Patent—

1. Automatically working pond-drainer consisting of solid masonry, a pipe of fire-brick in said masonry, having the form of a loop, an inlet opening in said pipe situated at the ground of the pond and a plurality of sockets one of said sockets being arranged at the uppermost part of the pipe, and a flap-valve being provided in said pipe being controlled by the rising water, and a flap at said uppermost socket being controlled by hand and closing said socket air-tight.

2. Automatically working pond-drainer consisting of solid masonry, a pipe of fire-brick in said masonry, having the form of a loop, an inlet opening in said pipe arranged at the ground of the pond and a plurality of sockets, said sockets being arranged at different levels of the pond in order to be able to drain off the water unto certain different levels, said sockets being provided with plugs closing the same, one of said sockets being arranged at the uppermost part of the pipe said socket emerging from the normal level of the water and being provided with a flap being controlled by hand and closing the socket air-tight, a flap-valve being provided within the pipe being controlled by the rising water, for the purpose described.

In testimony whereof I have affixed my signature in presence of two witnesses.

ARTHUR WEINHOLD.

Witnesses:
RUDOLPH FRICKE,
WM. P. KENT.

Copies of this patent may be obtained for five cents each, by addressing the "Commissioner of Patents, Washington, D. C."